United States Patent
Egolf

(10) Patent No.: US 6,360,194 B1
(45) Date of Patent: Mar. 19, 2002

(54) DIFFERENT WORD SIZE MULTIPROCESSOR EMULATION

(75) Inventor: David A. Egolf, Glendale, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 0 days.

(21) Appl. No.: 09/149,261

(22) Filed: Sep. 8, 1998

(51) Int. Cl.[7] ............... G06F 13/00; G06F 9/44
(52) U.S. Cl. ............... 703/26; 703/20; 703/27; 710/200; 714/35
(58) Field of Search ............... 703/20, 21, 26, 703/27, 28; 710/200; 714/35

(56) References Cited

U.S. PATENT DOCUMENTS

| | | | | |
|---|---|---|---|---|
| 4,370,709 A | * | 1/1983 | Fosdick ............... | 364/200 |
| 5,345,580 A | * | 9/1994 | Tamaru et al. ............... | 395/500 |
| 5,678,032 A | * | 10/1997 | Woods et al. ............... | 395/500 |
| 5,832,292 A | * | 11/1998 | Nguyen et al. ............... | 395/800.23 |
| 5,889,983 A | * | 3/1999 | Mittal et al. ............... | 395/564 |
| 5,896,522 A | * | 4/1999 | Ward et al. ............... | 395/500 |
| 5,970,241 A | * | 10/1999 | Deao et al. ............... | 395/568 |
| 5,991,531 A | * | 11/1999 | Song et al. ............... | 395/500.47 |
| 5,991,870 A | * | 11/1999 | Koumura et al. ............... | 712/208 |

* cited by examiner

Primary Examiner—Kevin J. Teska
Assistant Examiner—T. Phan
(74) Attorney, Agent, or Firm—B. E. Hayden; J. H. Phillips; J. S. Solakian

(57) ABSTRACT

In the emulation of a target system utilizing a multiprocessor (12) host system (10) with a longer word length than the target system, processor, memory, and cache overhead are minimized by utilizing a locked compare-exchange to update fill words in memory. The old contents of a word (48) in memory are loaded (80) into a first register (52). A loop is then entered. The contents of the first register (52) are copied (82) into a second (54). The contents of the second register (54) are then appropriately modified (84), depending on the instruction being emulated. After a lock (90), the two registers are compare-exchanged (86) with the memory word (48), resulting in the modified second register (54) being written to the memory word (48) if the contents of the first register (52) match. Otherwise, the compare-exchange instruction (86) loads the current copy of the word (48) into the first register (52), and the loop repeats.

19 Claims, 5 Drawing Sheets

DIFFERENT WORD SIZE MULTIPROCESSOR EMULATION

FIELD OF THE INVENTION

The present invention generally relates to computer system emulation, and more specifically to emulation of a target system utilizing a multiprocessor host system with a dissimilar word length.

BACKGROUND OF THE INVENTION

The cost of designing a computer processor continues to increase. Some computer architectures thus ultimately become uneconomical to implement directly, despite these architectures having significant installed bases.

One solution to this problem is to simulate one computer architecture on another computer architecture. Herein, the simulating computer architecture will be termed the "host" computer system, while the simulated computer architecture will be termed the "target" computer system. Emulators have been available almost since the advent of the first compilers.

Emulators typically utilize the same word length and byte length on the host computer system and the target computer system. One reason for this is that it is significantly easier to implement a similar system emulator. Another reason is that most computer architectures presently are 32-bit architectures. However, there is a move toward 64-bit architectures. Two 32-bit words fit exactly within a single 64-bit word. This is not the situation where the target system operates on for example 36 bits, while the host system operates on 64 bits. Any problems encountered when implementing an emulator on a host system are significantly increased when the word size of the emulated target system does not evenly divide the word size of the host system.

When the two architectures have different word sizes the data type alignment of the target data in the emulated host memory will not align with the native data types in the host emulation machine. This is particularly a problem in multiprocessor emulations that require atomicity for updates of adjacent target data types within a cache line of the emulating host system memory. The atomicity of the emulating host system will not match the required atomicity of the emulated target system. This is because the atomicity paradigms of the host system will not properly merge the updates within a cache line.

This would normally be addressed by use of a separate software gating mechanism. A distinct gate would be employed by each instance of the processor emulation in order to perform any data update to the emulated memory where atomicity needed to be enforced. Such a software gating mechanism typically employs hardware instructions to lock and unlock an agreed-to gate operand in order to guarantee single-threaded operation. This software gating mechanism has the potential of adding significant processor, memory, and bus overhead to the operation of the emulator.

It would thus be advantageous to be able to emulate efficiently a target system that has a word size and/or byte size that is not the same as that of the emulating host system. It would be even more advantageous to be able to emulate efficiently such a system when the word size of the host system is not an even multiple of the word size of the emulated target system. In performing this emulation, an efficient mechanism for updating cached memory contents without violating atomicity constraints of an emulated target system would also be advantageous.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth plot such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. The term "bus" will be used to refer to a plurality of signals or conductors which may be used to transfer one or more various types of information, such as data, addresses, control, or status.

A host system emulates a target system that has a word size with fewer bits than the word size of the host system. Data is stored in RAM, on disk, and on tape preferably in a right-justified form. However, the present invention will also work with other justifications. This justified form is useful in performing fixed-point arithmetic computations. The unused high order bits may be used for other purposes.

Figure 1:
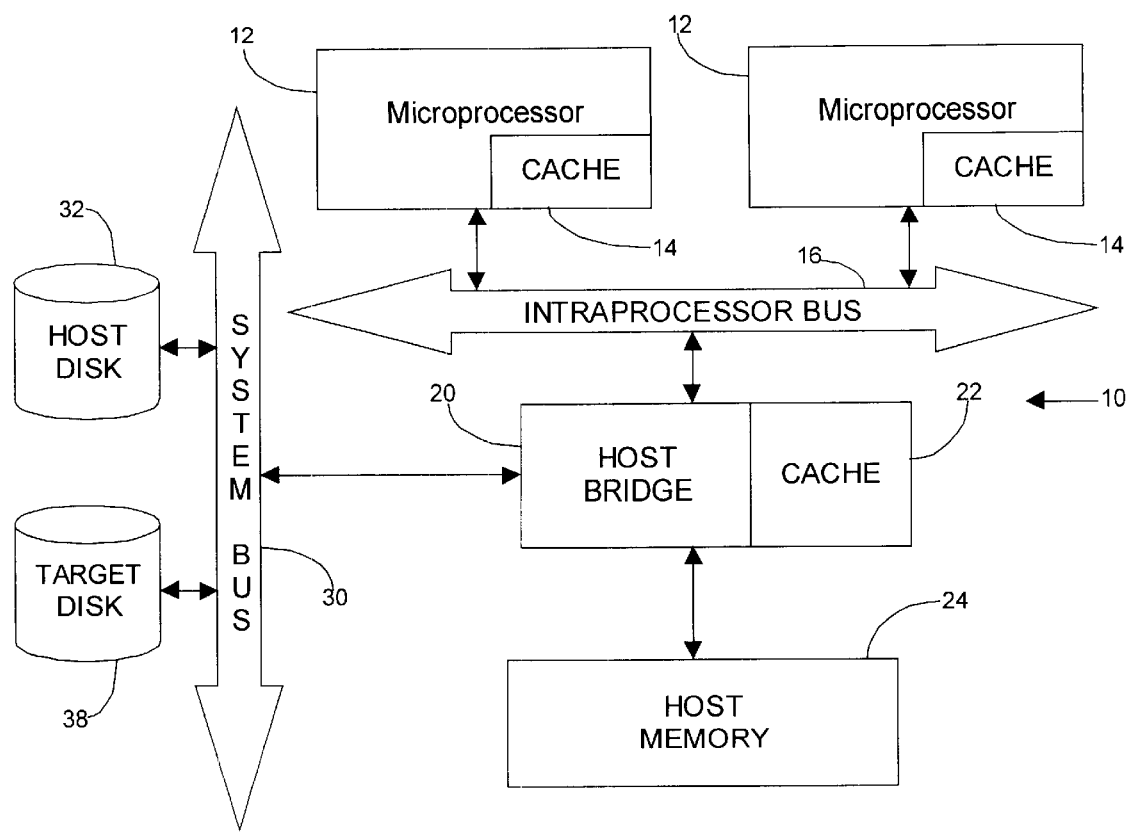
FIG. 1 is a block diagram illustrating a multiprocessor host system utilized to emulate a target system with a narrower word size, in accordance with the present invention.

FIG. 1 is a block diagram illustrating a multiprocessor host system utilized t emulate a target system with a narrower word size. In the preferred embodiment, the host system utilizes 64-bit words, whereas the target system supports 36-bit words. A multiprocessor system is shown in order to provide the level of performance necessary to emulate large-scale enterprise level target systems. The multiprocessor system 10 shows two (2) microprocessors 12, each containing its own copy of level-one (L1) cache memory 14. Some examples of microprocessors include Pentium II and Merced microprocessors from Intel Corporation, PowerPC microprocessors from Motorola, Inc. and IBM, and SPARC processors from Sun Microsystems. The L1 cache is typically implemented as extremely high-speed static random access memory (SRAM). The L1 cache may be implemented on the same semiconductor die as the microprocessor 12, or may be implemented as part of a multi-chip-module (MCM) with the microprocessor 12. La any case, the L1 cache 14 for each microprocessor 12 is dedicated to that microprocessor 12. Note that two microprocessors are shown. This is for illustrative purposes, and it is understood that this invention envisions additional microprocessors.

The two shown microprocessors 12 are coupled by and communicate over an intraprocessor bus 16. One of the functions of this intraprocessor bus 16 is to allow the two microprocessors 12 to communicate sufficiently so as to maintain coherence between their respective L1 caches 14. A single bus has been shown. However, multiple busses are also within the scope of this invention.

Also coupled to the intraprocessor bus 16 is a host bridge 20. This provides communications between the microprocessors 12 and the remainder of the computer system 10. Shown attached (but alternatively coupled) to the host bridge is a level-two (L2) cache 22. This L2 cache 22 is shared by all of the processors 12 in the system 10. The L2 cache 22 also typically consists of SRAM. However, it need not be as fast as the L1 cache 14, which typically operates at a speed comparable to that of the processors 12. Instead, a typical system will contain significantly more L2 cache 22 than L1 cache 14. Coupled to the Host Bridge 20 is also host memory 24. This is typically Dynamic Random Access Memory (DRAM). However, other types of memory may be utilized, including SRAM. Host memories 24 typically contain several orders of magnitude more memory than either the L2 cache 22 or the L1 cache 14.

Also coupled to the Host Bridge 20 is a system bus 30. The system bus 30 is utilized to couple the system 10 to lower speed peripheral devices. These lower speed peripheral devices can include display monitors, keyboards, communications devices, and the like (not shown here). Also coupled to the system bus are disk drives and other forms of storage capable of permanently storing data for the computer system 10. Shown in this figure are a host disk drive 32 and a target disk drive 38. The host disk drive 32 typically contains the software required to emulate the target system on the host system. The target disk drive 38 contains the software being emulated. It should be noted that the host disk drive 32 is shown distinct from the target disk drive 38. Additionally, only a single host disk drive 32 and target disk drive 38 are shown. It is shown this way for illustrative purposes. However, the present invention also envisions combining the two on shared drives. It must also be noted that the target disk drive 38 will often actually consist of a large number of different physical disk drives. This is especially true when host systems capable of supporting enterprise level databases are emulated.

Memory is considered herein a relatively high speed machine readable medium and includes Volatile Memories, such as DRAM 24, and SRAM 14, 22, and Non-Volatile Memories (not shown) such as, ROM, FLASH, EPROM, EEPROM, and bubble memory. Secondary Storage 32, 38 includes machine-readable media such as hard disk drives, magnetic drum, and bubble memory. External Storage (not shown) includes machine-readable media such as floppy disks, removable hard drives, magnetic tape, CD-ROM, and even other computers, possibly connected via a communications line. The distinction drawn here between Secondary Storage 32, 38 and External Storage is primarily for convenience in describing the invention. As such, it should be appreciated that there is substantial functional overlap between these elements. Computer software such as target emulation software and user programs can be stored in a Computer Software Storage Medium, such as Memory 14, 22, 24, Secondary Storage 32, 38, and External Storage. Executable versions of computer software can be read from a Non-Volatile Storage Medium such as External Storage (not shown), Secondary Storage 32, 38, and Non-Volatile Memory (not shown), and loaded for execution directly into Volatile Memory 14, 22, 24, executed directly out of Non-Volatile Memory, or stored on the Secondary Storage 32, 30 prior to loading into Volatile Memory 14, 22, 24 for execution.

Figure 2:
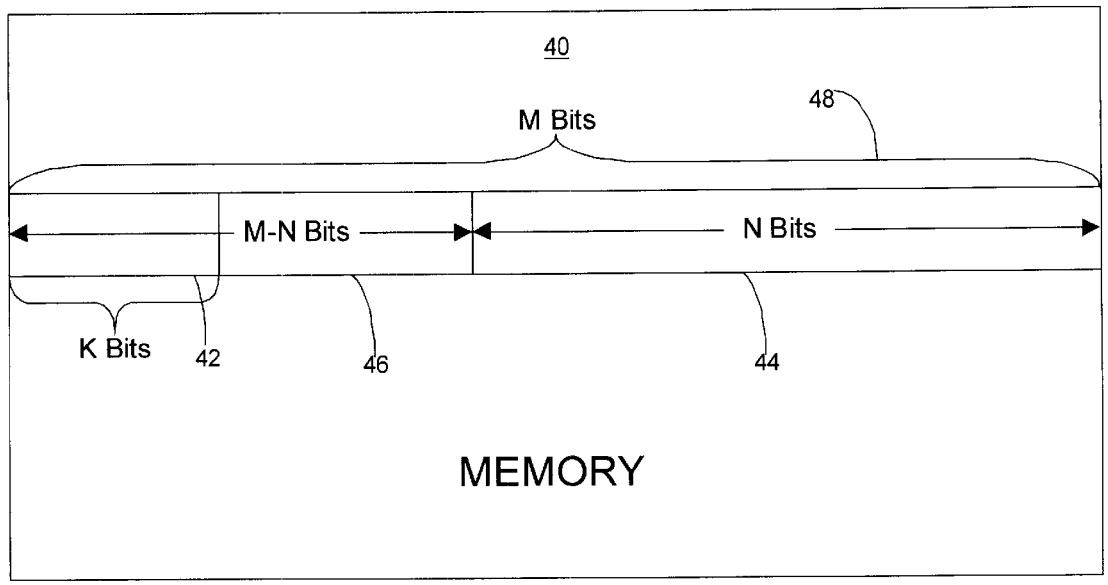
FIG. 2 is a block diagram that illustrates storing target words in host words, when the host words contain more bits than the target words, in accordance with the present invention.

FIG. 2 is a block diagram that illustrates storing target words in host words, when the host words contain more bits than the target words. Each host word 48 is stored in a memory 40. The memory may be the host memory 24, the L1 cache 22, the L2 cache 14 of an executing microprocessor 12, a register within the executing microprocessor 12, or in peripheral memory, such as on the target disk drive 38. Each host word 48 contains "M" bits. In the preferred embodiment, "M" is equal to 64, and is typical for microprocessors being introduced in the immediate future. The target system utilizes "N" bit words. For example, "N" is equal to 36 when emulating a GCOS-8 computer system from Bull HN Information Systems Inc., or a 2200 series computer system from Unisys Corporation. These systems may be emulated on an Intel Merced system with "M" equal to 64. In another example, PowerPC models 603 and 604 with "N" equal to 32 may be emulated on such a 64-bit Intel Merced system. Each host word 48 can be divided into two parts: an "N" bit target word part 44, and a "M-N" bit portion 46 unused by emulated code in the target system.

The M-N high-order bits 46 are not directly used to emulate the target system. This is because the emulated target system utilizes the low order N-bits. The M-N high-order bits 46 are thus available for other uses in the emulation. Modification of some of these high order bits 42 can be expedited if M-N is greater than or equal to the system byte size, typically eight (8) bits. In such an instance, a K-bit subset 42 of the M-N high order bits 46 can typically be directly read and written to memory, with K being equal to a power of eight (i.e. 8, 16, 32), and with K being less than or equal to M-N. Thus, if M is equal to 64 and N is equal to 16, then K can be equal to either 8 or 16. The top order 8 or 16 bits can be directly written without the necessity of reading, masking, and writing that would be otherwise required.

The M-N high order bits 46 can be utilized for a number of different purposes when emulating a target system with a narrower word size than the emulating host system. One such use, discussed below, writes either a high order byte or half-word to memory and cache to force a specific cache line into cache.

One requirement for a tightly coupled multiprocessor system is support for atomic instructions. An atomic instruction is one that guarantees complete execution by one processor before another processor has a chance to intervene. In particular, tightly coupled multiprocessor systems require that atomic instructions be able to guarantee uninterrupted access to memory.

It is necessary to guarantee that emulated target system instructions have the same atomicity when emulated on a host system as when executed in native mode. In the prior aft, this guarantee of atomicity has typically been accomplished by use of a memory lock over each section of target system memory. Each processor in a multiprocessor system will typically set the lock, update the memory, then clear the lock. At its simplest, a single lock is used to lock all of target memory. This has the problem that each lock potentially interferes with each other processor, regardless of what target memory is being accessed. This can be optimized by using a number of locks, with each of the locks being dedicated to a block of memory. This provides some relief. This can be later further refined by dedicating a lock for each word of target memory. This still however requires significant processor locking and unlocking overhead. It also requires memory space for the locks themselves.

A much more efficient mechanism is utilized in the present invention. An exchange-store instruction is executed on the host system to atomically up date target memory. Some examples of such an exchange-store instruction are the Compare and Exchange instructions available in the Intel Pentium class architecture. In the preferred embodiment in the host Pentium class architecture, a "CMPXCHG8B" or Compare and Exchange 8 Byte instruction is utilized as the Compare and Exchange instruction to guarantee target system atomicity. By employing the compare-and-exchange instruction for each memory update, a minimum level of multiprocessor lock contention is achieved with no explicit allocation of memory.

Figure 3:
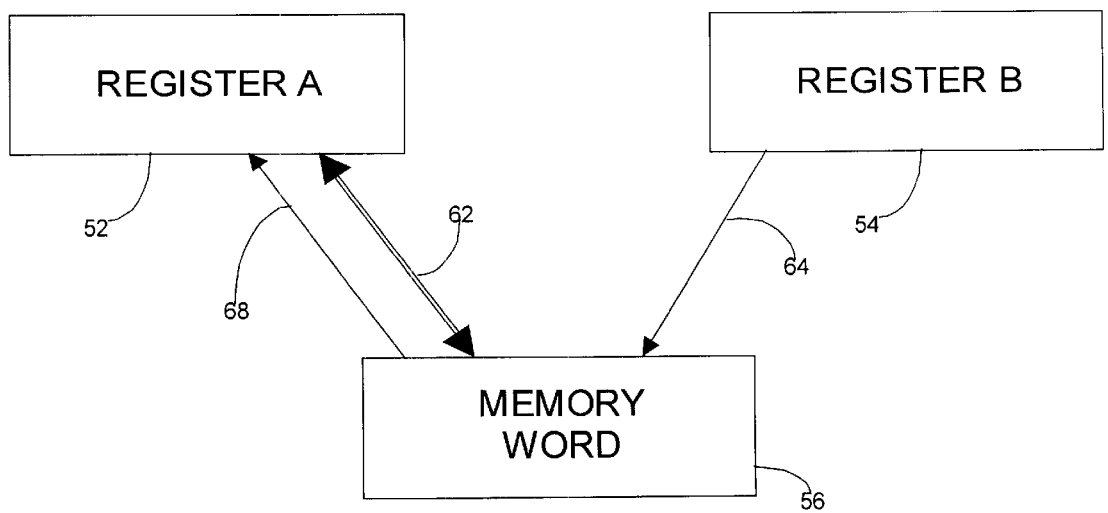
FIG. 3 is a block diagram and FIG. 4 is a flowchart that together illustrate operation of a Compare and Exchange type of instruction.
Figure 4:
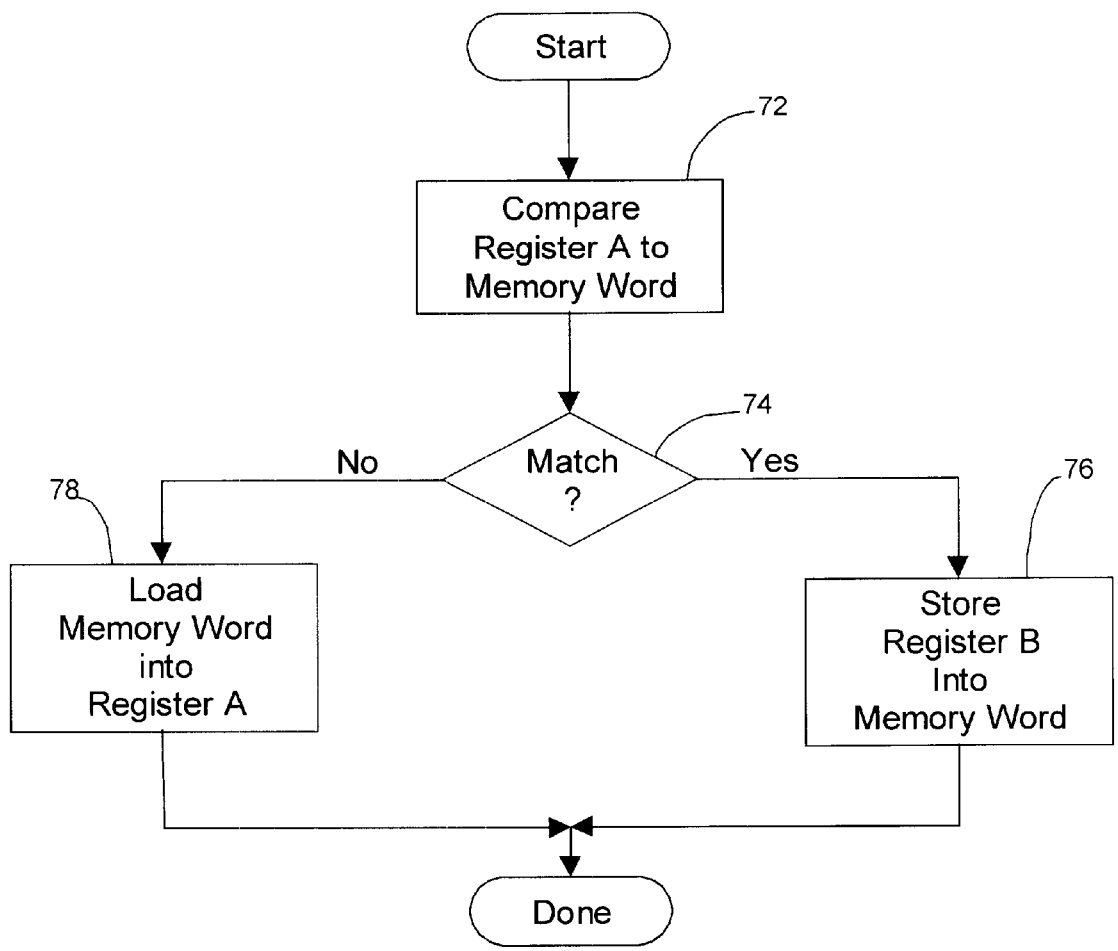

FIG. 3 is a block diagram that illustrates operation of a Compare and Exchange type of instruction. FIG. 4 is a flowchart that illustrates operation of a Compare and Exchange type of instruction. A value in a first register (Register A) 52 is compared 62 with a word in memory 56, step 72. If the word in memory 56 matches 62 the word in Register A 52, step 74, the contents of a second register (Register B) 54 are written 64 to the memory word 56 in the same uninterrupted single memory cycle, step 76. If the contents of the memory word 56 do not match the contents of Register A 52, step 74, the contents of the memory word 56 are written 68 into that Register A 52, step 78. In the case of the CMPXCHG8B instruction referenced above, a ZF flag in a status register is set if the word in memory 56 matches 62 the word in register A 52, and is cleared if the word in memory 56 does not match 62 the word in register A 52. This flag may be used by subsequent conditional branch instructions.

Figure 5:
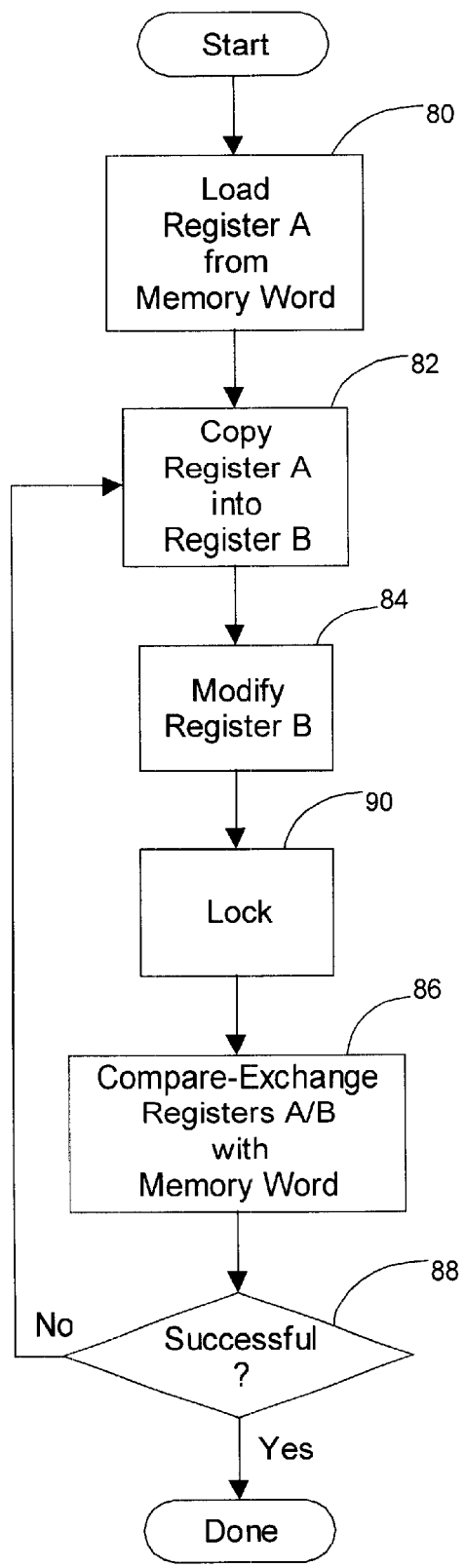
FIG. 5 is a flowchart that illustrates utilization of a compare-exchange instruction in an uncached multiprocessor system, in accordance with the present invention.

FIG. 5 is a flowchart that illustrates utilization of a compare-exchange instruction in an uncached multiprocessor system. Register A 52 is loaded from the word in memory 56, step 80. Then, a loop is entered. First, the contents of Register A 52 are moved to Register B 54, step 82. Modifications are then made to Register B 54, step 84. The modifications made are determined by the instruction being emulated. The cache line for the corresponding memory word is locked, step 90. In the case of the Intel Pentium architectures, the LOCK instruction results in the assertion of a LOCK it signal during the execution of the next instruction. Assertion of this LOCK//signal guarantees atomicity of that next instruction executed, A compare-exchange instruction is then executed, step 86, The LOCK# signal asserted during the execution of this compare-exchange instruction guarantees the atomicity of this instruction. If the compare-exchange instruction was not successfully executed, step 88, the loop is repeated, starting with moving the contents of Register A 52 to Register B 54, step 82. Note that at this point the current contents of the memory word have been loaded into Register A 52. In the case of the CMPXCHG8B instruction referenced above, the ZF flag is set by execution of the instruction, and a conditional branch instruction testing that flag may be utilized to test for success or failure of the comparison, step 74. The contents of Register A 52 can be seen as a key, matching the contents of the designated word in memory 56, unless that word has been modified in the meantime by another processor. In that case, the newly modified word in memory is loaded into Register A 52 by the compare-exchange instruction, step 86, and the loop is repeated until the old value of the memory word 56 stored in Register A 52 matches the contents of the memory word 56 when the compare-exchange instruction is executed, step 86.

Emulators typically require numerous instructions of the host computer to emulate a single instruction of the target computer. In an uncached multiprocessor emulation system, there may thus be numerous instructions executed by the host computer between loading a first register (Register A) 52, step 80, and the time when the second register (Register B) 54 is written back to the corresponding word in memory 56, step 86. A large "timing window" is opened up by this operation, allowing the possibility of having another processor modify the word in memory 56 during the timing window. The method described in FIG. 5 closes this timing window.

Figure 6:
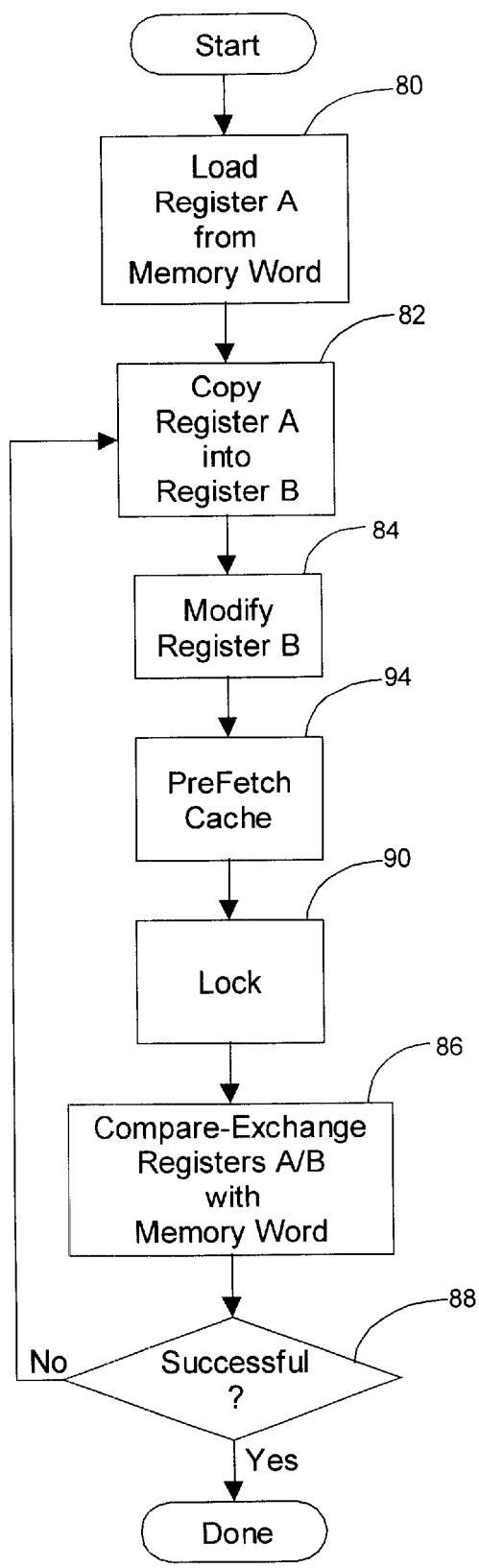
FIG. 6 is a flowchart illustrating a method for updating words in emulation memory in multiprocessor emulation systems that have L2 cache tightly coupled to individual microprocessors when the architecture utilizes bus locking to lock cache lines that are not currently in cache memory, in accordance with the present invention.

FIG. 6 is a flowchart illustrating a method for updating words in emulation memory in multiprocessor emulation systems that have L1 cache 14 tightly coupled to individual microprocessors 12 when the architecture utilizes bus locking to lock cache lines that are not currently in cache memory, As with FIG. 5, Register A 52 is loaded from the memory word, step 80. A loop is then entered. Within the loop, the contents of Register A 52 are copied to Register B 54, step 82. Next, the contents of Register B are modified, step 84. Bits in Register B 54 may be set or cleared. This is followed by pulling the word in the cache memory into the cache memories, if not already there, step 94. Some architectures directly support this action, for example with a "TOUCH" instruction. Alternatively, some architectures provide a speculative load that can be utilized for this purpose. For those architectures that do not directly support some form of prefetching, it can be forced by writing to the memory word 56. In the case of emulating an architecture where M-N is greater than or equal to eight (8), the high order byte 46 in the memory word 56 may be written. This will not corrupt the target data in the lower order N-bits of the memory word 56. It should be noted that the above was the preferred embodiment. In an alternate embodiment the marking or "touching" of the cache, step 94, is performed before the copying of the contents of Register A 52 into Register B 54, step 82.

After the memory has been touched or marked, step 94, the cache line is locked, step 96, the contents of Registers A 52 and B 54 are compare-exchanged with the memory word 56, step 86, the cache line is unlocked, and the loop is repeated, starting with the marking or touching of the cache line, step 94. In the case of a failure of the compare-exchange instruction, Register A 52 is loaded with the current contents of the memory word 56 operand. As with FIG. 5, the locking, step 90, guarantees atomicity of the compare-exchange among multiple processors.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A method of updating a designated memory location in a shared emulated memory when emulating a multiprocessor target system utilizing a multiprocessor host system operating on the shared emulated memory, said method comprising:
   A) loading an initial operand comprising an instruction for the multiprocessor target system into a first register;
   B) loading the initial operand from the first register into a second register;
   C) modifying the initial operand in the second register to form a modified operand; and utilizing a compare-exchange instruction:
   D) testing whether a contents of the designated memory location matches the initial operand in the first register; and
   E) writing the modified operand in the second register to the designated memory location if the contents of the designated memory location matches the initial operand.

2. The method in claim 1 which further comprises:
   F) repeating steps (A), (B), (C), (D), and (E) until the contents of the designated memory location matches the initial operand in the test in step (D).

3. The method in claim 2 wherein:
   step (F) is implemented utilizing a branch-on-condition-code instruction that branches based on a condition code set by the compare-exchange instruction.

4. The method in claim 2 which further comprises:
   G) guaranteeing atomicity of steps (D) and (E) by locking a bus before step (D).

5. The method in claim 4 wherein:
   the locking in step (G) operates by asserting a LOCK// signal when executing steps (D) and (E).

6. The method in claim 4 which further comprises:
   H) repeating steps (A), (B), (C), (D), (E), and (F) as a loop until the contents of the designated memory location matches the initial operand in the test in step (D).

7. The method in claim 1 which further comprises:
   G) prefetching the contents of the designated memory location into a cache memory before steps (D) and (E).

8. The method in claim 7 wherein:
   the prefetching in step (G) stores a value into a portion of the designated memory location unused in the target system.

9. The method in claim 7 wherein:
   the prefetching in step (G) utilizes an explicit cache prefetch instruction.

10. A host data processing system for emulating a multiprocessor target system,
    wherein the host data processing system comprises:
       a plurality of processors;
       a memory coupled to and shared among the plurality of processors; and
       a portion of a target system emulation software stored in a Computer Software Storage Medium for updating a designated memory location in the memory, said portion of the target system emulation software comprising:
          A) a set of computer instructions stored in a Computer Software Storage Medium for loading an initial operand into a first register, which initial operand comprises an instruction for the multiprocessor target system;
          B) a set of computer instructions stored in a Computer Software Storage Medium for loading the initial operand from the first register into a second register;
          C) a set of computer instructions stored in a Computer Software Storage Medium for modifying the initial operand in the second register to form a modified operand;
          D) a set of computer instructions stored in a Computer Software Storage Medium for testing whether a contents of the designated memory location matches the initial operand in the first register; and
          E) a set of computer instructions stored in a Computer Software Storage Medium for writing the modified operand in the second register to the designated memory location if the contents of the designated memory location matches the initial operand;
          wherein sets (C) and (D) are implemented together as a common set and comprise a compare-exchange instruction.

11. The host data processing system in claim 10 which further comprises:
    F) a set of computer instructions stored in a Computer Software Storage Medium for repeating sets (A), (B), (C), (D), and (E) of computer instructions as a loop until the contents of the designated memory location matches the initial operand as a result of the testing in set (D) of computer instructions.

12. The host data processing system in claim 11 wherein:
    set (F) of computer instructions comprises:
       a branch-on-condition-code instruction that branches based on a condition code get by the compare-exchange instruction.

13. The host data processing system in claim 11 which further comprises:
    G) a set of computer instructions stored in a Computer Software Storage Medium for guaranteeing uninterrupted execution of sets (D) and (E) of computer instructions by locking a bus before executing sets (D) and (E) of computer instructions.

14. The host data processing system in claim 13 wherein:
    set (G) of computer instructions comprises:
       a lock function that operates by asserting a LOCK// signal when executing sets (D) and (E) of computer instructions.

15. The host data processing system in claim 13 which further comprises:
    H) a set of computer instructions stored in a Computer Software Storage Medium for repeating sets (A), (B), (C), (D), (E), and (F) of computer instructions as a loop until the contents of the designated memory location matches the initial operand as a result of the testing in set (D) of computer instructions.

16. The host data processing system in claim 10 which further comprises:
    G) a set of computer instructions stored in a Computer Software Storage Medium for prefetching the contents of the designated memory location into a cache memory before executing sets (D) and (E) of computer instructions.

17. The host data processing system in claim 16 wherein:
    set (G) of computer instructions comprises:
       a store instruction for storing a value into a portion of the designated memory location unused in the target system.

18. The host data processing system in claim 16 wherein get (G) of computer instructions comprises:
    an explicit cache prefetch instruction.

19. A computer readable Non-Volatile Storage Medium encoded with an emulation software program for emulating a multiprocessor target system on a multiprocessor host system operating on a shared emulated memory, wherein a portion of the emulation software program for updating a designated memory location in the shared emulated memory comprises:

A) a set of computer instructions for loading an initial operand into a first register, which initial operand comprises an instruction for the multiprocessor target system;

B) a set of computer instructions for loading the initial operand from the first register into a second register;

C) a set of computer instructions for modifying the initial operand in the second register to form a modified operand;

D) a set of computer instructions for testing whether a contents of the designated memory location matches the initial operand in the first register;

E) a set of computer instructions for writing the modified operand in the second register to the designated memory location if the contents of the designated memory location matches the initial operand; and F) a set of computer instructions for repeating sets (A), (B), (C), (D), and (E) of computer instructions as a loop until the contents of the designated memory location matches the initial operand as a result of the testing in set (D) of computer instructions;

wherein sets (C) and (D) are implemented together as a common set and comprise a compare-exchange instruction.

* * * * *